United States Patent
Muniyan et al.

(10) Patent No.: US 11,758,467 B2
(45) Date of Patent: Sep. 12, 2023

(54) MOBILE APPLICATION FOR PRIORITIZED COMMUNICATION

(71) Applicant: Glolink Technologies Inc., Bentonville, AR (US)

(72) Inventors: Kalaiselvan Muniyan, Bentonville, AR (US); Kalaiarasi Kalaiselvan, Bentonville, AR (US); Ridhikaanth Kalaiselvan, Bentonville, AR (US); Kaushik Kalaiselvan, Bentonville, AR (US)

(73) Assignee: GLOLINK TECHNOLOGIES INC., Bentonville, AR (US)

( * ) Notice: Subject to any disclaimer, the term of this patent is extended or adjusted under 35 U.S.C. 154(b) by 0 days.

(21) Appl. No.: 17/504,859

(22) Filed: Oct. 19, 2021

(65) Prior Publication Data

US 2022/0286942 A1    Sep. 8, 2022

Related U.S. Application Data

(60) Provisional application No. 63/094,521, filed on Oct. 21, 2020.

(51) Int. Cl.
| | |
|---|---|
| H04M 3/16 | (2006.01) |
| G06F 15/16 | (2006.01) |
| H04W 48/02 | (2009.01) |
| H04W 4/08 | (2009.01) |

(52) U.S. Cl.
CPC ............ *H04W 48/02* (2013.01); *H04W 4/08* (2013.01)

(58) Field of Classification Search
CPC ................................ H04W 48/02; H04W 4/08
USPC ......................................................... 455/411
See application file for complete search history.

(56) References Cited

U.S. PATENT DOCUMENTS

| | | | |
|---|---|---|---|
| 5,845,219 | A | 12/1998 | Henriksson |
| 6,574,471 | B1 | 6/2003 | Rydbeck |
| 7,580,678 | B2 | 8/2009 | Byman-Kivivuori |
| 7,606,561 | B2 | 10/2009 | Mathew |
| 8,494,575 | B2 | 7/2013 | Foley |
| 8,532,627 | B1 | 9/2013 | Nassimi |
| 8,576,828 | B1 | 11/2013 | Massey, Jr. |
| 8,612,403 | B2 | 12/2013 | Kraft |
| 8,868,053 | B2 | 10/2014 | Thompson |
| 9,239,726 | B2 | 1/2016 | Peterson |
| 9,509,650 | B2 | 11/2016 | Puranik |
| 10,079,939 | B1 | 9/2018 | Bostick |
| 10,673,798 | B2 | 6/2020 | Shan et al. |

(Continued)

FOREIGN PATENT DOCUMENTS

| | | |
|---|---|---|
| KR | 101820091 | 2/2018 |
| WO | 2015085402 | 6/2015 |
| WO | 2017124474 | 7/2017 |

OTHER PUBLICATIONS

International Search Report and Written Opinion from Corresponding PCT Patent Application PCT/US21/55841 dated Feb. 9, 2022; Korean Intellectual Property Office.

*Primary Examiner* — Mark G. Pannell
(74) *Attorney, Agent, or Firm* — Head, Johnson, Kachigian & Wilkinson, PC

(57) ABSTRACT

A mobile application capable of superseding default phone settings to give priority to calls and messages based on a preconfigured list, as well as broadcast messages and calls within a defined group of members.

12 Claims, 1 Drawing Sheet

(56) References Cited

U.S. PATENT DOCUMENTS

| | | | |
|---|---|---|---|
| 2003/0197615 A1* | 10/2003 | Roche | G08B 25/14 340/531 |
| 2004/0094619 A1* | 5/2004 | Silberberg | G07F 17/0014 235/382 |
| 2004/0225733 A1* | 11/2004 | Tesink | H04M 3/5158 709/225 |
| 2005/0008127 A1* | 1/2005 | Holmes | H04M 11/045 379/88.16 |
| 2005/0286701 A1* | 12/2005 | Suvanne | H04M 3/436 379/207.11 |
| 2008/0025489 A1 | 1/2008 | Dye et al. | |
| 2009/0119374 A1* | 5/2009 | O'Sullivan | H04L 51/043 709/206 |
| 2009/0170492 A1* | 7/2009 | Lee | H04M 1/72451 455/418 |
| 2011/0244824 A1 | 10/2011 | Hursey et al. | |
| 2012/0306649 A1* | 12/2012 | Rodger | G08B 21/06 340/540 |
| 2012/0312247 A1* | 12/2012 | Ebersole | A01K 15/02 340/573.3 |
| 2013/0244623 A1 | 9/2013 | Cudack | |
| 2015/0181031 A1 | 6/2015 | Warnack | |
| 2016/0050642 A1* | 2/2016 | Brown | H04W 8/22 455/418 |
| 2016/0330160 A1* | 11/2016 | Shan | H04L 51/214 |
| 2019/0289367 A1* | 9/2019 | Siddiq | H04N 21/485 |
| 2021/0084710 A1* | 3/2021 | Sutherland | G08B 27/006 |
| 2021/0104158 A1* | 4/2021 | Pasotto | G08G 1/096855 |

\* cited by examiner

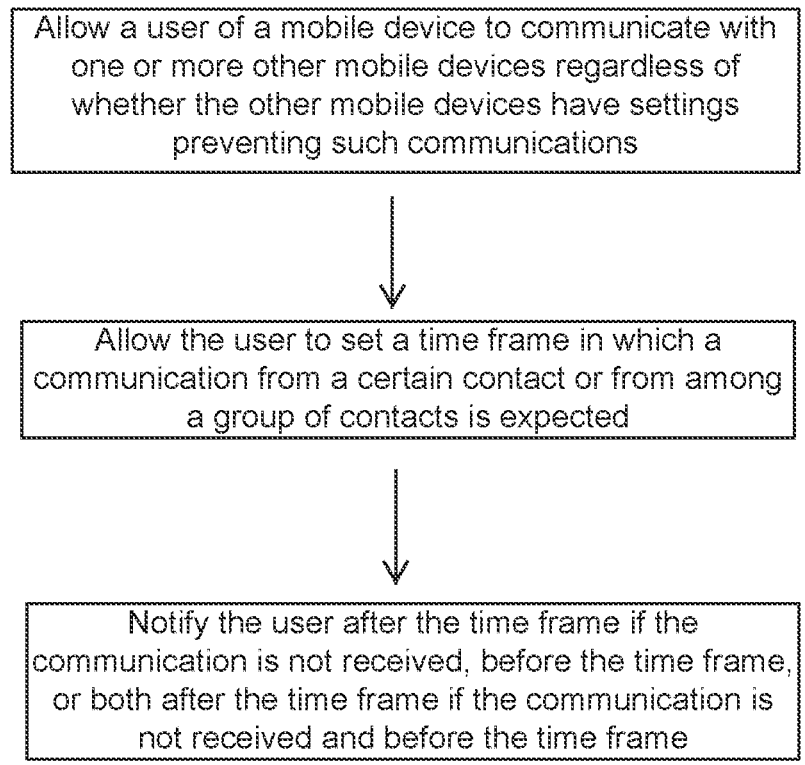

MOBILE APPLICATION FOR PRIORITIZED COMMUNICATION

CROSS REFERENCE

This application is based on and claims priority to U.S. Provisional Patent Application No. 63/094,521 filed Oct. 21, 2020.

BACKGROUND OF THE INVENTION

Field of the Invention

This invention relates generally to a mobile application for prioritized communication, and more particularly, but not by way of limitation, to a mobile application capable of superseding default phone settings to give priority to calls and messages based on a preconfigured list, as well as broadcast messages and calls within a defined group of members.

Description of the Related Art

Many people keep a mobile device with them at all times for communication. It is increasingly common for users of such mobile devices to keep their devices in silent mode or do not disturb mode at all times. This may cause the users to miss desired communication, such as communication from family members or other trusted contacts, as well as expected calls during a specific time frame.

Sometimes users are part of a permanent group, such as a family, wherein the ability to communicate among members, regardless of each members' device settings, is desired at all times. Other times, users are part of a temporary group, such as attendees at an event, wherein the ability of the event organizers to communicate with attendees, regardless of each attendee's device settings, is desired for the duration of the event. For example, such events may include sporting events, workplace events/meetings, birthday parties, or natural disasters. The organizers of such an event may need to communication important information to the attendees of the event, and may also desire to prevent attendees from receiving disruptive communications, like phone calls, during the event.

Based on the foregoing, it is desirable to provide a mobile application that allows a user to communicate with the mobile device of another user, regardless of the settings of that mobile device.

It is further desirable for the mobile application to allow such prioritized communication to occur from a central user to recipient users only for the duration of an event.

It is further desirable for the mobile application to prevent all other communication to recipient users for the duration of the event, and to provide notice after the event of any blocked communications.

It is further desirable for the mobile application to allow such prioritized communication to occur between certain group members at all times.

It is further desirable for the mobile application to notify a user if a communication was expected during a designate time frame, but was not received.

SUMMARY OF THE INVENTION

In general, in a first aspect, the invention relates to a mobile application capable of superseding default phone settings to give priority to calls and messages based on a preconfigured list, as well as broadcasting messages and calls within a defined group of members.

The mobile application may be used in a method of prioritizing communication by a mobile device, the method comprising allowing a user of the mobile device to communicate with one or more other mobile devices regardless of whether the other mobile devices have settings preventing such communications.

The user of the mobile device is a central user and the other mobile devices are used by recipient users. The recipient users may be attending an event and the central user may be involved in managing the event. Allowing the user of the mobile device to communicate with the one or more other mobile devices regardless of whether the other mobile devices have settings preventing such communications may occur only during the event or other designated period of time.

The method may further comprise preventing communication to the mobile devices of the central user and/or the recipient users other than communication from the central user during the designated period of time. The method may further comprise notifying each central user or recipient user of blocked communications, where such notification occurs after the designated period of time. The method may further comprise notifying each central user or recipient user of communications that were expected but not received during the designated period of time, where such notification occurs after the designated period of time.

Communications may occur in real-time. Additionally or alternately, communications may be pre-recorded and communicated when initiated by the central user. Additionally or alternately, communications may be pre-recorded and communicated automatically at a scheduled time.

The user of the mobile device and users of the other mobile devices may be members of a group, such as a family group.

The method may further comprise: allowing the user to set a time frame in which a communication from a certain contact or from among a group of contacts is expected and notifying the user: after the time frame if the communication is not received; before the time frame; or both after the time frame if the communication is not received and before the time frame.

BRIEF DESCRIPTION OF THE DRAWINGS

FIG. 1 is a flow chart illustrating the claimed method of the present invention.

DETAILED DESCRIPTION OF THE INVENTION

The devices and methods discussed herein are merely illustrative of specific manners in which to make and use this invention and are not to be interpreted as limiting in scope.

While the devices and methods have been described with a certain degree of particularity, it is to be noted that many modifications may be made in the details of the construction and the arrangement of the devices and components without departing from the spirit and scope of this disclosure. It is understood that the devices and methods are not limited to the embodiments set forth herein for purposes of exemplification.

In general, in a first aspect, the invention relates to a mobile application for prioritized communication. The application may be capable of superseding default phone settings to give priority to calls and messages from contacts on a preconfigured list. The application may be capable of broadcasting messages and calls within a defined group of members.

The application may provide for a list of configured contacts, which may be phone numbers configured into a group or multiple groups. For example, groups may include a family group, an office group, a political group, a sports organization, and sports team, two individuals, or any other desired group.

The application may provide for one-way communication. This feature may be ideal for organizations or large-scale teams. The one-way communication feature may be used for events held by an organization or a team that requires effective communication of announcements for various situations, ranging from scheduled activities to emergencies. For example, the one-way communication feature may be used by sports teams, at public sports events like bicycling or runs, at workplace events or meetings, at birthday parties, or during natural disasters. For the one-way communication feature, the application may provide for one central user, who facilitates all communication and acts as the host to the group or team, and multiple recipient users.

The application may allow the central user and the recipient users to supersede their messages, calls, and other notifications from outside preconfigured groups of contacts or individual configured contacts for the entire duration of an event or a desired time frame set by the central user. The central user may be able to configure the outside preconfigured groups of contacts or individual configured contacts. In the case of the central user and the recipient users, the application may provide an auto-answer feature, described below, for the outside configured groups of contacts and individual configured contacts who are expected to give the central user calls or messages via audio or text. This may be disabled for a desired time frame set by the central user. The application may allow the central user and the recipient users to customize the way in which the notifications by outside configured groups of contacts and individual configured contacts are communicated to the user immediately following the end of the user's set time frame. The app may either display the missed notifications via text or speak the notifications. The user may also be contacted immediately following the end of the user's set time frame for the event if the expected notifications from expected configured contacts, both of which had to have been previously set by the user, were not received in that set time frame.

As superseding introduces new priorities in the various users to whom the central user is communicating, the application may require permission to be acquired by the central user for legal and privacy concerns. This permission may need to be granted at each event that is facilitated by the central user in order to ensure an accurate and updated mutual agreement among the recipient users and the central user.

Each recipient user may or may not have the application installed on their mobile device. If the recipient user does not have the application installed, then any agreements, consents, and permissions may be validated by the recipient users through some method of contact. The authorization may be effective for one event only and may have to be reauthorized for each event thereafter, regardless of whether the future events are recurring, in order to maintain mutual agreement among the central and recipient users.

During use of the one-way communication feature, the application may allow voice notifications to be sent by the central user to the recipient users in real-time. The application may additionally or alternately allow the central user to pre-record and store voice notifications. The application may allow the central user to manually send stored voice notifications at a time in which the central user sees fit, according to his or her event/program schedule. The application may additionally or alternately send stored voice notifications at a scheduled time set by the central user.

The application may allow any user, whether the central user or a recipient user, to set a time frame in which notifications and/or broadcasts are disabled. In the case of the central user, the application may allow the central user to disable the auto-answer feature for configured contacts who are expected to give the central user calls or messages for a time interval set by the central user. In the case of the central and recipient users, the application may allow the user to disable any broadcasts, including calls, audio messages, and text messages, that are expected to be received from certain configured contacts who were previously set by the user for the time interval set by the user. In all cases, at the end of the time interval set by the user, the application may allow the user to be notified of any broadcasts, including calls, audio messages, and text messages, that were received by the user during the set time interval. The application may allow the central user and the recipient users to customize the way in which the notifications by outside configured groups of contacts and individual configured contacts are communicated to the user immediately following the end of the user's set time frame. The application may either display the missed notifications via text or speak the notifications. The application may also communicate with the user immediately following the end of the user's set time frame for the event if the expected notifications from expected configured contacts, both of which had to have been previously set by the user, were not received in that set time frame. Again, the user could either choose to make these notifications be displayed via text immediately following the set time interval or displayed via text and spoken out loud immediately following the set time interval.

The application may additionally or alternately provide for two-way communication. This feature may be ideal for communications at the family level. The two-way communication feature may provide the aforementioned broadcasting features described above for one-way communication, but with the ability for all family users to respond and set preferences for each other. In other words, all family users may have the privileges of central users described above.

The application may be capable of monitoring incoming calls to family users to identify if the call is from a configured contact. If so, the application may be capable of superseding the phone settings to ring the phone with volume regardless of the mode that the phone is in, such as do not disturb mode, silent mode, etc. The application may allow the user to set calls from a specific phone number that are to be expected in a specific time frame. The application may allow the user to set priorities for superseding the calls for the configured contacts: priorities for superseding may be set among groups of configured contacts, i.e. one group over another; priorities for superseding may be set for individual configured contacts within an existing group; and/or priorities for superseding may be set for individual configured contacts, whether they are in a group or not.

The application may allow calls from configured contacts to work in synchrony with their respective time parameters. The application may allow users to set a time frame for when to expect certain calls from certain configured contacts. The application may provide retrospective notification when an expected call is not received within the time frame set by the user from a particular configured contact or a member of a particular group of configured contacts. The retrospective notification may occur when the set time frame ends. The application may additionally or alternately provide proactive notification when the time frame set by the user begins or at a certain number of minutes before the time frame begins. The proactive notification may notify the user that they should expect a call from a particular configured contact or a member of a particular group of configured contacts in that time frame.

The application may provide an auto-answer feature, which may allow the application to pick up a call from a configured contact in a certain amount of time if the user does not attend to the call within that set time frame. The time frame of when the phone rings until the application automatically answers may be customized by the user. The application may acquire agreement from the user to automatically answer the call to avoid any legal issues or privacy concerns. Permission from phone carriers and/or operating systems may need to be acquired in order to enable some of the features.

The application may be used with mobile phone devices and/or wearable devices such as smartwatches, fitness trackers, Google Glass, etc. or other mobile devices. Additionally or alternately, the application may be or may be used with a desktop and/or web application. For example, a central user organizing large scale events may require higher-order web infrastructure to accommodate the massive capacity of recipients and the text and/or voice notifications that would need to be sent to those recipients at a pre-defined manner, as set by the central user. Also, even though the use of the desktop and web applications may be best suited for large scale events, any users, be it family, small groups, etc., may also be able to use the desktop and web application should they want to manage their application profile on the desktop and/or web.

Whereas, the devices and methods have been described in relation to the drawings and claims, it should be understood that other and further modifications, apart from those shown or suggested herein, may be made within the spirit and scope of this invention.

What is claimed is:

1. A method of prioritizing communication by a mobile device, the method comprising:
    allowing a user of the mobile device to communicate with one or more other mobile devices regardless of whether the other mobile devices have settings preventing such communications;
    allowing the user to set a time frame in which a communication from a certain contact or from among a group of contacts is expected; and
    notifying the user:
        after the time frame if the communication is not received;
        before the time frame; or
        both after the time frame if the communication is not received and before the time frame.

2. The method of claim 1 where the user of the mobile device is a central user and the other mobile devices are used by recipient users.

3. The method of claim 2 where the recipient users are attending an event and the central user is involved in managing the event.

4. The method of claim 3 where allowing the user of the mobile device to communicate with the one or more other mobile devices regardless of whether the other mobile devices have settings preventing such communications occurs only during the event.

5. The method of claim 2 where allowing the user of the mobile device to communicate with the one or more other mobile devices regardless of whether the other mobile devices have settings preventing such communications occurs only during a designated period of time.

6. The method of claim 5 further comprising preventing communication to the mobile devices of the central user and/or the recipient users other than communication from the central user during the designated period of time.

7. The method of claim 6 further comprising notifying each central user or recipient user of blocked communications, where such notification occurs after the designated period of time.

8. The method of claim 6 further comprising notifying each central user or recipient user of communications that were expected but not received during the designated period of time, where such notification occurs after the designated period of time.

9. The method of claim 2 where communications occur in real-time.

10. The method of claim 2 where communications are pre-recorded and communicated when initiated by the central user.

11. The method of claim 2 where communications are pre-recorded and communicated automatically at a scheduled time.

12. The method of claim 1 where the user of the mobile device and users of the other mobile devices are members of a group.

\* \* \* \* \*